Figure 1:
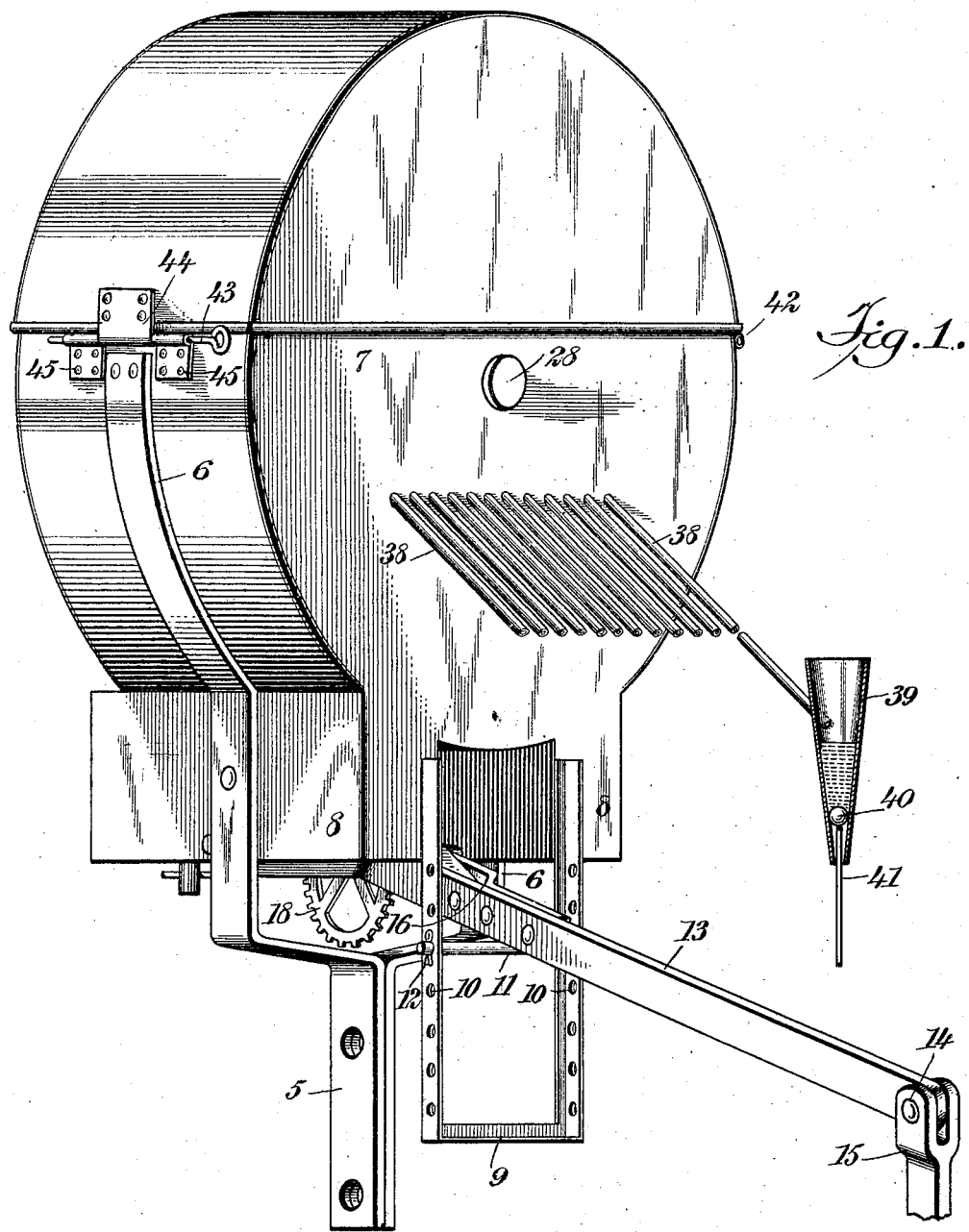

No. 772,187. PATENTED OCT. 11, 1904.
H. H. TATSCH.
WINDMILL LUBRICATOR.
APPLICATION FILED SEPT. 5, 1903.
NO MODEL. 2 SHEETS—SHEET 1.

WITNESSES:

INVENTOR
Hubert H. Tatsch
BY
ATTORNEYS

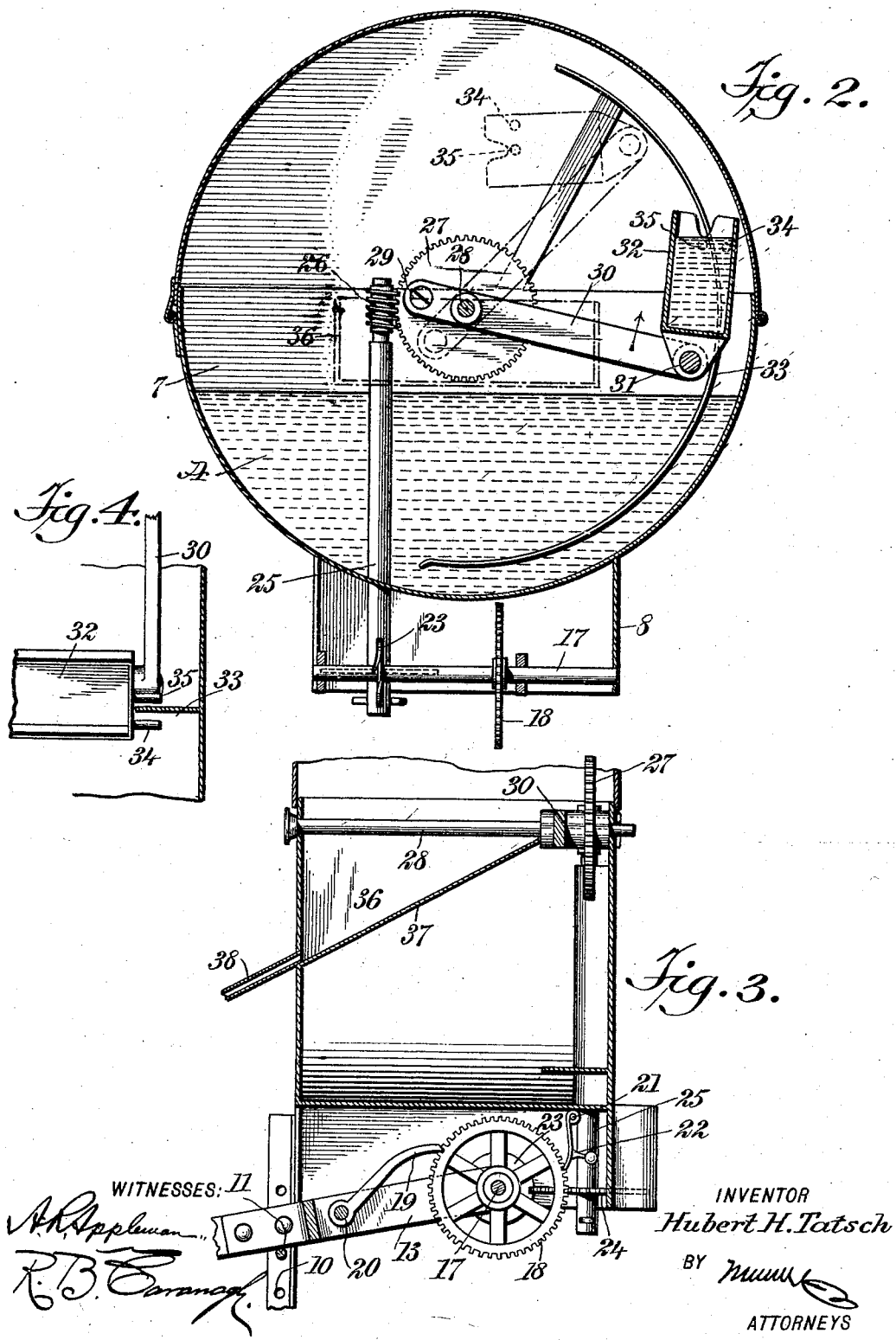

No. 772,187.

Patented October 11, 1904.

UNITED STATES PATENT OFFICE.

HUBERT H. TATSCH, OF FREDERICKSBURG, TEXAS.

WINDMILL-LUBRICATOR.

SPECIFICATION forming part of Letters Patent No. 772,187, dated October 11, 1904.

Application filed September 5, 1903. Serial No. 172,101. (No model.)

*To all whom it may concern:*

Be it known that I, HUBERT H. TATSCH, a citizen of the United States, and a resident of Fredericksburg, in the county of Gillespie and State of Texas, have invented new and useful Improvements in Windmill-Lubricators, of which the following is a full, clear, and exact description.

This invention appertains to an improved lubricating device, and has particular application to a lubricator designed especially for use in connection with windmills.

An object of my invention is to provide a lubricator adapted at predetermined times to supply a lubricant to a receptacle, from which receptacle ducts lead off the lubricant to the portions of the windmill to be subjected to the lubricating process.

A further object of my invention is to provide a device which will be automatic in its operation—that is to say, the lubricating operation will not take place until certain mechanism actuated from the mill-pitman is brought into operation to supply the receptacle, above referred to, with the lubricant.

Still another object of the invention is to provide a lubricator which is so incased or housed that the possibility of dust, ice, snow, or the like clogging or otherwise interfering with the operation of the parts will be obviated.

Finally, I have in view as an object to provide a lubricator which will be exceedingly simple and durable in its construction, positive in its operation, and capable of being readily attached to any windmill.

With the above-recited objects and others of a similar nature in view my invention consists in the construction, combination, and arrangement of parts, as is described in this specification, delineated in the accompanying drawings, and set forth in the appended claims.

Reference is to be had to the accompanying drawings, forming a part of this specification, in which similar characters of reference indicate corresponding parts in all the figures.

Figure 1 is a perspective view of a windmill-lubricator embodying my improvements. Fig. 2 is a vertical sectional view taken through a lubricator shown in Fig. 1. Fig. 3 is a detail view, partly in section, showing the position of certain parts of the mechanism designed to supply lubricant to the receptacle from which it is conveyed to the parts of the mill; and Fig. 4 is a detail view, partly in section, of a portion of the bucket designed to convey the lubricant to the receptacle.

Referring now to the accompanying drawings in detail, 5 designates the shank of a bifurcated bracket, the arms 6 6 of such bracket being designed to be secured to the main casing 7 of the device. Depending from the base portion 8 of the aforesaid casing is a hanger 9, having formed in the parallel side bars thereof the registering apertures 10 10, which are designed to receive and support a cross-bar 11, held in position by means of a cotter-pin 12. Adapted to rest upon this bar is a relatively long lever 13, pivoted at 14 to one end of the arm 15, said arm in turn resting upon the pitman of the windmill. (Not shown.) The opposite end of the lever 13, which is formed with a bifurcation 16, is loosely mounted on a shaft 17, journaled in the base portion 8 of the casing. Upon this shaft is fixed a gearwheel 18, the periphery of said wheel having about fifty teeth cut therein, said teeth being normally engaged by a gravity-pawl 19, pivoted at 20 between the arms of the bifurcated portions of the lever 13. Suspended at 21 from a point slightly above the gear-wheel 18 is a second weighted gravity-pawl 22, designed to engage with the teeth of the gear-wheel to prevent such gear-wheel turning back after it has been given a forward impulse or movement when the lever 13 is lowered by the action of the windmill-pitman, for, as will be noted, this movement of the lever 13 causes the pawl 19 to rise and drop into the next notch in the wheel 18, said movement giving the wheel a backward impulse. There is also mounted upon the rotating shaft 17 a worm-gear 23, designed to engage or mesh with a horizontally-disposed toothed gear-wheel 24, carried by the vertically-arranged shaft 25. This shaft 25, which extends up through the casing to approximately centrally of the interior, has at such upper end a worm-gear 26, meshing with a gear-wheel 27, journaled upon the shaft 28, extending transversely of the casing. When the shaft 25 is turned through the lower intermeshing gear-wheels, the worm at the upper end thereof will drive the gear-wheel 27, which gear-wheel has secured thereto, through the medium of a screw 29, an arm 30, such arm having pivotally connected thereto at its outer end 31 a cup or bucket 32. This bucket is intended to take up a portion of the lubricant A, placed in the body of the casing, and as the gear-wheel 27 is revolved said bucket will move upward and be directed in its path of movement by the curved guiding-strip 33, arranged adjacent to the side of the casing, said strip being approximately semicircular in conformation, the bucket being guided with relation to said strip through the medium of the guide-pins 34 35, secured to the bucket one at each side of said strip. When said cup or bucket has reached the upper end of the strip, the movement of the wheels still continuing, the guide-pins will pass the end of the strip, and the bucket, no longer sustained, will swing or drop down through gravity upon its pivot-point, as is clearly seen in dotted lines in Fig. 2. The lubricant contained in such bucket will then be poured into a box-like receptacle 36, arranged at one side of the casing. The bottom 37 of said receptacle is downwardly inclined, and leading therefrom at its lower end are a number of tubular oil pipes or ducts 38, which projecting through the side of the casing convey the oil from the receptacle to any suitable point on the windmill. For example, in Fig. 1 I have shown a conical cup 39, designed to receive oil from one of the pipes, said cup having a ball-valve 40 near the lower end thereof, the stem 41 of said valve being designed to be connected with the crank-shaft of the windmill, so that on each movement of said crank-shaft the ball-valve will move upward and permit oil to drop upon the parts of the windmill to be lubricated. After the bucket 32 has been emptied it continues its circular path of travel and is immersed in the oil, the bucket is again filled, and the operation is continued.

It is to be noted in particular that the frequency with which the bucket of oil at the end of the arm is emptied in the receptacle 36 depends entirely upon the gearing mechanism—that is to say, if the gear-wheel 18 has fifty teeth, and a similar number of teeth are formed on the horizontal gear-wheel 24 and the upper gear-wheel 28, the bucket will make one complete revolution with every one hundred and twenty-five thousand strokes of the pitman of the windmill, inasmuch as it will be observed that the gear-wheel 24 will only be moved one tooth with every complete revolution of the shaft 17. It will further be seen that the bar 11, carried by the hanger 9, may be placed higher or lower therein to regulate the throw of the lever 13, and consequently alter the frequency with which the windmill will be lubricated.

The casing of the device, which is approximately cylindrical in form, is made up in two parts, the upper of which is hinged at 42 to the lower section, so that such upper section may act as a cover protecting the parts from dust, and yet enable the lubricant to be readily supplied to the casing. The cover may be locked in any suitable manner, such as by the pin 43 engaging with the hasp 44 and plates 45, as will be clearly seen in Fig. 1.

From the above description the construction and operation of my improved device will be readily apparent, and it is unnecessary to further describe the same here in detail. This device will be found especially adapted for use in large windmills, where it is difficult to obtain access to the various parts for the purpose of lubrication.

Having thus described my invention, I claim as new and desire to secure by Letters Patent—

1. A lubricating device, comprising a casing designed to contain a lubricant, a stationary receptacle within said casing, means including a tilting bucket movable in a circle within the casing for taking the lubricant therefrom and depositing the same within the receptacle at predetermined periods, means for preventing the bucket from tilting until it reaches the desired point and means for conveying the lubricant from the receptacle, substantially as set forth.

2. The combination of a casing, designed to contain a lubricant, a receptacle within said casing arranged above the level of the lubricant, means movable within the casing for taking the lubricant from the casing and carrying the same to a point above the receptacle, and a semicircular guide-strip arranged concentric with a portion of the casing-wall holding the lubricant-carrying means upright until it reaches such point above the receptacle, the construction being such that when the said lubricant-carrying means have reached the termination of the guiding means, the lubricant will be deposited within the receptacle, substantially as set forth.

3. A lubricating device, comprising a casing designed to contain a lubricant, a receptacle arranged within said casing at a point above the level of the lubricant, an arm arranged to swing in a circle within the casing, a bucket pivotally secured to the arm and adapted to carry the lubricant from such casing to a point above the receptacle and deposit such lubricant in the receptacle, and means for preventing the bucket from swinging on its pivot to deposit the lubricant, until it reaches the said point above the receptacle, substantially as set forth.

4. A device of the class described, comprising a casing, designed to contain a lubricant, a receptacle within said casing, a rotatable shaft journaled in the casing, an arm carried by said shaft, a bucket secured to the arm and designed to take the lubricant from the casing, and by the movement of the shaft to carry the lubricant to a point above the receptacle, a curved guide-strip for holding the bucket in position to retain the lubricant until it reaches the point above the receptacle, and means for rotating the shaft to cause the bucket to make a complete revolution of the same, the construction being such that when the bucket has reached the position above the receptacle, the lubricant within the bucket will be deposited within said receptacle, substantially as set forth.

5. A lubricating device, comprising a casing designed to contain a lubricant, a receptacle, a shaft journaled in the casing, a tilting bucket connected to said shaft, means for driving the shaft to cause the bucket to make a complete revolution around the same at predetermined periods, and means for preventing the bucket from tilting until it reaches a point above said receptacle, substantially as set forth.

6. A lubricating device, comprising a casing designed to contain a lubricant, a receptacle within said casing, a shaft journaled within the casing, an arm connected to and adapted to be turned about said shaft, a bucket pivoted to said arm and adapted to take the lubricant from the casing, and means for holding said bucket in position to retain its contents until it reaches a point above the receptacle, the construction being such that said bucket will be moved upon its pivot and the lubricant deposited in said receptacle, substantially as as set forth.

7. The combination of a casing, adapted to be secured to a windmill and to contain a lubricant, a receptacle within said casing, a shaft journaled within the casing, means actuated by the movement of the shaft for carrying a portion of the lubricant to a point above the receptacle and depositing the same therein, and actuating devices operated from the pitman of the windmill for actuating the shaft and thereby causing the oil to be taken from the casing and deposited within the receptacle after a predetermined number of strokes of the windmill-pitman, the said actuating devices including a lever in engagement with the pitman, a pawl carried by said lever, a gear-wheel moved by said pawl, and power-transmitting devices between the gear-wheel and the said shaft, substantially as set forth.

8. The combination of a casing, adapted to be secured to a windmill, said casing being designed to contain a lubricant, a receptacle within said casing, a shaft journaled upon said casing at the lower portion thereof, a connection between said shaft and the pitman of the windmill, a gear-wheel carried by said shaft and designed to be actuated from the pitman connection for turning said shaft, a worm-gear also carried by said shaft, a vertical shaft extending to a point approximately centrally within the casing, a gear-wheel carried at the lower end of said vertical shaft and meshing with the worm-gear, a third shaft extending transversely, centrally of the casing, a gear-wheel carried by said third shaft, and meshing with the vertical shaft, an arm connected to the gear-wheel of the third shaft, a bucket pivoted to said arm, the construction being such that motion will be transmitted from the pitman of the windmill to the gear-wheel of the third-mentioned shaft to cause the revolution of the bucket about said shaft, said bucket in its revolution taking the lubricant from the casing, means for guiding the bucket to a point above the receptacle, said bucket being tilted by gravity at such point above the receptacle to deposit the lubricant therein, and means for conveying the lubricant from the receptacle to parts of the windmill to lubricate the same, substantially as set forth.

9. The combination of a casing designed to be secured to a windmill and adapted to contain a lubricant, a receptacle, a bucket within said casing, means for transmitting motion from the pitman of the windmill to cause the bucket to make a revolution within the casing, and take up the lubricant and deposit the same in the receptacle during such revolution, such means including a lever in engagement with the pitman of the windmill, and power-transmitting devices between the lever and the bucket, and a bracket secured to the casing of the windmill, said bracket carrying a bar for limiting the stroke of the lever, substantially as set forth.

In testimony whereof I have signed my name to this specification in the presence of two subscribing witnesses.

HUBERT H. TATSCH

Witnesses:
 EMIL GOLD,
 RICH BONN.